(12) United States Patent
Lee et al.

(10) Patent No.: US 7,351,520 B2
(45) Date of Patent: Apr. 1, 2008

(54) MICRO-LENS ARRAY AND MANUFACTURING METHOD THEREOF

(75) Inventors: Myung-bok Lee, Suwon-si (KR); Jin-seung Shon, Seoul (KR); Mee-suk Jung, Suwon-si (KR); Eun-hyoung Cho, Seoul (KR); Hae-sung Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 747 days.

(21) Appl. No.: 10/928,171

(22) Filed: Aug. 30, 2004

(65) Prior Publication Data

US 2005/0074702 A1    Apr. 7, 2005

(30) Foreign Application Priority Data

Oct. 7, 2003    (KR) ...................... 10-2003-0069729

(51) Int. Cl.
   *G02B 3/00*    (2006.01)

(52) U.S. Cl. ........................ 430/321; 264/2.5; 264/447; 264/496

(58) Field of Classification Search .................... None
   See application file for complete search history.

(56) References Cited

U.S. PATENT DOCUMENTS 5,578,156 A * 11/1996 Kamakura et al. ........ 156/275.5
6,407,866 B1 * 6/2002 Yamashita et al. .......... 359/619

* cited by examiner

*Primary Examiner*—John A. McPherson
(74) *Attorney, Agent, or Firm*—Sughrue Mion, PLLC

(57) ABSTRACT

A micro-lens array and manufacturing method. A hybrid micro-lens in which a refractive lens and a diffraction lens are formed includes: a refractive lens; a first ultraviolet hardening material which is bonded on a curved surface of the refractive lens to form an aspheric surface; a support substrate including a concave portion into which the refractive lens is inserted and supported; and a diffraction lens which is formed at a position corresponding to the refractive lens disposed on the support substrate.

14 Claims, 14 Drawing Sheets

MICRO-LENS ARRAY AND MANUFACTURING METHOD THEREOF

This application claims the priority of Korean Patent Application No. 2003-69729, filed on Oct. 7, 2003, in the Korean Intellectual Property Office, the disclosure of which is incorporated herein in its entirety by reference.

BACKGROUND OF THE INVENTION

1. Field of the Invention

The present invention relates to a method of manufacturing a micro-lens array, and more particularly, to a method of precisely manufacturing a micro-lens array including a micro-lens having a high numerical aperture.

2. Description of the Related Art

A micro-lens may be manufactured by a method of forming a single micro-lens using a machining process, a method of forming a micro-lens array through a photolithography process using photoresist, etc.

Among conventional methods of manufacturing a micro-lens, a machining process directly grinds or cuts glass or plastic material. Injection molding or press molding is used to mass-produce an object lens. The injection molding or press molding is a method of manufacturing a lens from a melt or semi-molten plastic or glass using a die made by a machining process, such as a cutting or abrasive process. FIG. 1 is a schematic view showing a method of manufacturing a conventional single micro-lens using such a machining process.

A conventional method of manufacturing a glass single lens using a press molding will now be described with reference to FIG. 1. Upper and lower dies 11 and 13, which are made of super-hard metal, etc., are very precisely ground in a shape corresponding to a surface of a lens. A ball or gob-shaped glass preform is inserted between the upper and lower dies 11 and 13 and is pressed and heated at a temperature of 500° C. to 600° C., thereby forming a lens.

The method using an ultraprecise die has an advantage in that it can achieve a very precise curved surface process. However, as the size of the lens is made smaller, it is difficult to manufacture a die for a lens having a high numerical aperture, that is, a die for an aspheric surface having a large radius of curvature. This is because there is a limit to the radius of curvature of a processing tool. Also, such a glass molding method has a disadvantage in that productivity is low because it takes a long time to uniformly heat a preform material through its interior.

In the case where a lens is manufactured using a plastic material, a cavity die is molded by cutting a metal very precisely, and a melt plastic is injection molded to produce a lens. In plastic injection molding, the molding temperature is 300° C. or less, which is lower than the glass molding temperature. Also, the plastic injection molding can use a die having a plurality of cavities, so that manufacturing time is shorter and productivity is higher than that of glass molding. Further, the plastic lens is lightweight and processability is excellent. The plastic lens can be manufactured at a low cost. Therefore, the plastic lens has been widely used as a pickup lens for CD and DVD applications.

However, the plastic material has a low refractive index of about 1.5, such that light refraction is insufficient. Thus, two lenses must be used to manufacture a lens for a Blue-Ray Disc having a numerical aperture of 0.85. Considerable time and effort are required to assemble and precisely adjust the position of the two lenses, thereby increasing manufacturing cost much more than in the case of a single lens. Also, the plastic is susceptible to heat, and its optical characteristics (for example, refractive index, thermal expansion, etc.) can change greatly depending on a change in temperature. Specifically, the plastic absorbs blue wavelength light, thus causing a yellowing phenomenon after use over a long period of time. As a result, the property of the material is changed. Since the object lens of the optical pickup is used to condense light, such phenomenon may cause a serious problem in such a lens.

A single lens may be manufactured using a machining process, but it is difficult to assemble the single lens with a device such as an optical module. In order to facilitate assembly, a flat type or multiple array type is desired. In order to make an array type lens, a micro process instead of a machining process is widely used. Among them, a photolithography process is most typical.

FIGS. 2A through 2E are sectional views showing sequential procedures of manufacturing a conventional micro-lens array using a photolithography process. Referring to FIG. 2A, a photoresist 23 is coated on a substrate 21. Referring to FIG. 2B, a mask M having a predetermined pattern is positioned on the photoresist 23 and an ultraviolet ray is irradiated to expose the photoresist 23. Referring to FIG. 2C, the exposed portion of the photoresist 23 is developed to form a patterned photoresist 23a. Referring to FIG. 2D, a reflow process is performed by applying heat to the patterned photoresist 23a, thus deforming the photoresist 23a into a preform 23b having a shape of a circular spherical lens. Referring to FIG. 2E, the shape of the lens preform is transferred on the substrate by anisotropic etching, such as by reactive ion etching, thereby forming a micro-lens array on the substrate.

According to the above conventional method of manufacturing a micro-lens array using a photolithography process, it is difficult to implement a high sag for obtaining a high numerical aperture. Accordingly, it is difficult to process an aspheric curved surface for aberration correction.

SUMMARY OF THE INVENTION

The present invention provides a micro-lens array and a manufacturing method thereof, in which a micro-lens array having a high numerical aperture is manufactured using a simple process.

According to an aspect of the present invention, a method of manufacturing a micro-lens array is provided, which includes: (a) forming at least one cavity on a substrate; (b) injecting a first ultraviolet hardening material into the cavity and positioning a lens on the first ultraviolet hardening material; and (c) coating a second ultraviolet hardening material on the lens and a surface of the substrate, positioning a transparent plate on the second ultraviolet hardening material, and irradiating an ultraviolet ray while pressing the second ultraviolet hardening material, thereby hardening the first and second ultraviolet hardening materials.

The method further includes: (d) demolding the substrate from the lens and the ultraviolet hardening material and aligning and assembling a support substrate with respect to the lens; and (e) forming a diffraction lens at a position corresponding to the lens that is formed on the support substrate.

The forming of the at least one cavity includes: coating a photoresist on the substrate, positioning a mask having a predetermined pattern, and performing exposure and development processes to pattern the photoresist; etching the exposed portion of the substrate to form the at least one cavity; and removing the photoresist and applying pressure to a surface of the cavity using an ultraprecise aspheric punch, thereby molding the cavity.

The ultraviolet hardening material is one of a liquid polymer and a sol-gel inorganic material. The ultraprecise aspheric punch may be formed of a super-hard metal. The lens may be a half ball lens.

The operation (c) includes: demolding the transparent plate from the lens and the second ultraviolet hardening material; and demolding the substrate from the lens and the first ultraviolet hardening material.

According to another aspect of the present invention, a method of manufacturing a micro-lens array is provided, which includes: (a) forming at least one cavity on a substrate; (b) injecting a first ultraviolet hardening material into the cavity and positioning a lens on the first ultraviolet hardening material; (c) positioning a first transparent plate on the lens, irradiating a ultraviolet ray while pressing the lens, thereby hardening the first ultraviolet hardening material, and removing the first transparent plate; and (d) coating a second ultraviolet hardening material on the lens and a surface of the substrate, positioning a second transparent plate on the second ultraviolet hardening material, and irradiating an ultraviolet ray while pressing the lens, thereby hardening the first and second ultraviolet hardening materials.

The method further includes: (e) demolding the substrate from the lens and the ultraviolet hardening material, and aligning and assembling a support substrate with respect to the lens; and (f) grinding the lens and the second ultraviolet hardening material to a predetermined thickness, and forming a diffraction lens at a position corresponding to the half ball lens that is formed on the support substrate.

The operation (d) may include: coating a second ultraviolet hardening material on the lens and a surface of the substrate; positioning a second transparent plate on the substrate and the second ultraviolet hardening material, irradiating a ultraviolet ray while pressing the lens, thereby hardening the first and second ultraviolet hardening materials; and grinding the lens and the second ultraviolet hardening material to a predetermined thickness.

According to yet another aspect of the present invention, a hybrid micro-lens is provided including a refractive lens and a diffraction lens. The hybrid micro-lens includes: a refractive lens; a first ultraviolet hardening material which is bonded on a curved surface of the refractive lens to form an aspheric surface; a support substrate including a concave portion into which the refractive lens is inserted and supported; and a diffraction lens which is formed at a position corresponding to the refractive lens disposed on the support substrate.

The hybrid micro-lens may further include a second ultraviolet hardening material which attaches the refractive lens to the support substrate.

The hybrid micro-lens may further include a transparent plate which is formed on a flat portion of the refractive lens and attached by the second ultraviolet hardening material.

The refractive lens may have a refractive index ranging from 1.7 to 2.2.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
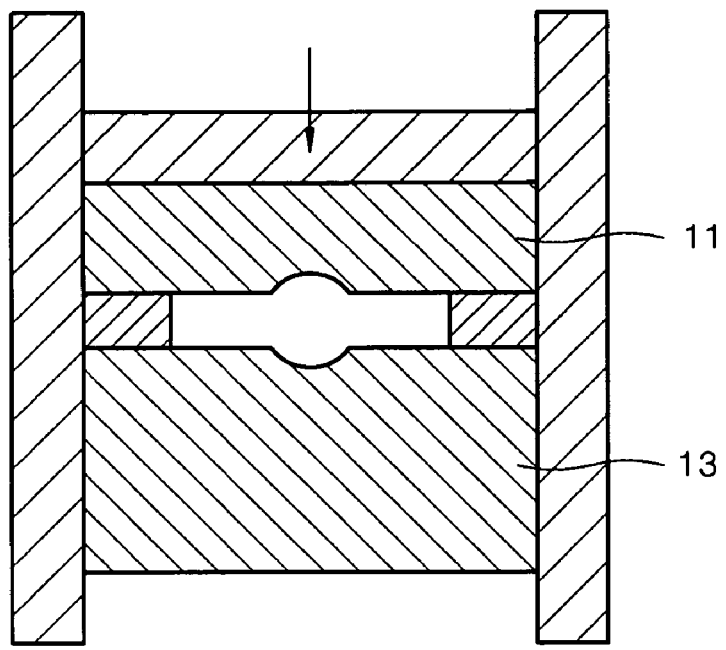
FIG. 1 is a schematic view showing a method of manufacturing a single micro-lens using a machining process.
Figure 1:
Figure 1:
Figure 2A:
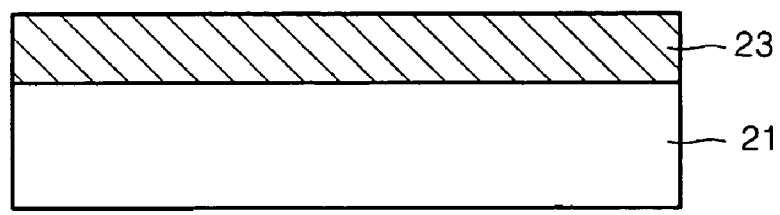
FIGS. 2A through 2E are sectional views showing sequential procedures of manufacturing a conventional micro-lens array using a photolithography process.
Figure 2B:
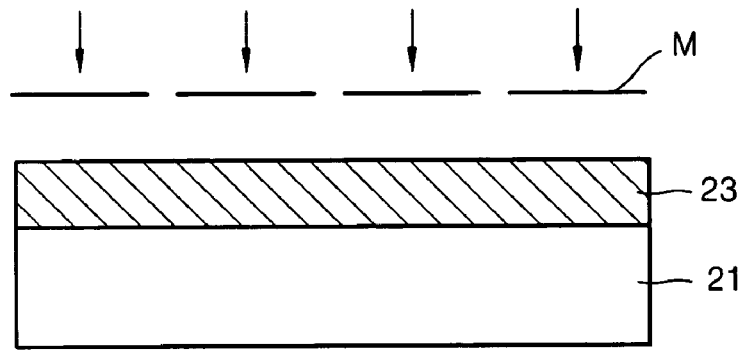
Figure 2C:
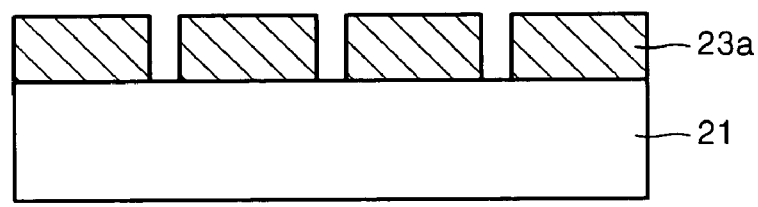
Figure 2D:
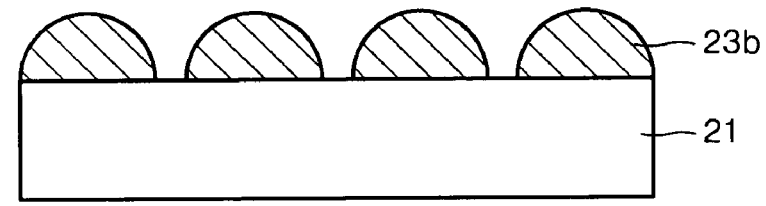
Figure 2E:
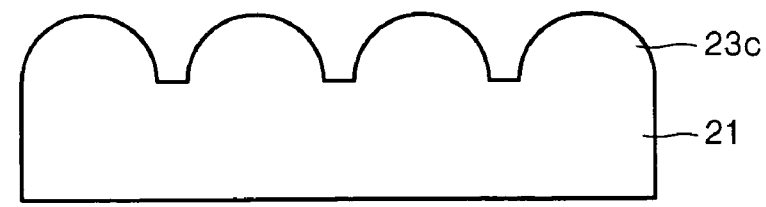

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the thickness of layers and regions are exaggerated for clarity. Like reference numerals in the drawings denote like elements, and thus their description will be omitted.

FIGS. 3A through 3F are sectional views illustrating sequential procedures of manufacturing a die for an aspheric lens array that is used in a micro-lens according to the present invention.

Figure 3A:
FIGS. 3A through 3F are sectional views illustrating sequential procedures of manufacturing a die for an aspheric lens array that is used in a micro-lens according to the present invention.
Figure 3B:
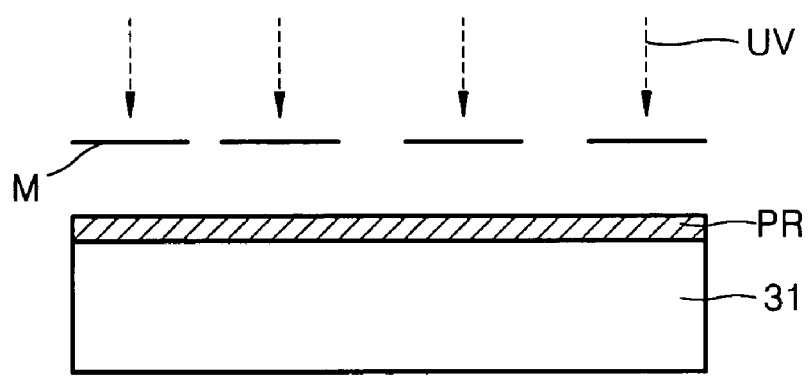
Figure 3C:
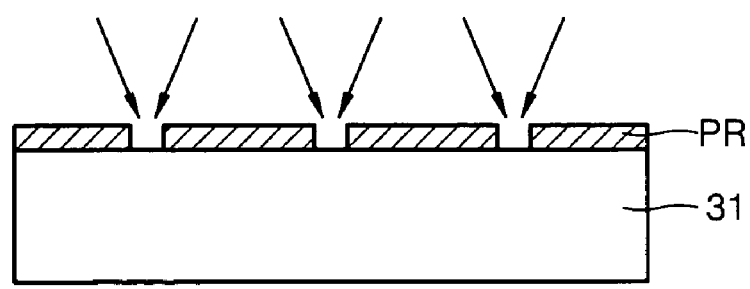

Referring to FIG. 3A, a substrate 31 is prepared. Preferably, the substrate 31 is formed of a glass-based material. Photoresist PR is coated on the substrate 31 by spin coating, etc. Referring to FIG. 3B, photo mask M is disposed at a predetermined position and is exposed to an ultraviolet (UV) ray. Referring to FIG. 3C, after exposure, a development process is performed such that the exposed photoresist PR is removed by a developer.

Figure 3D:
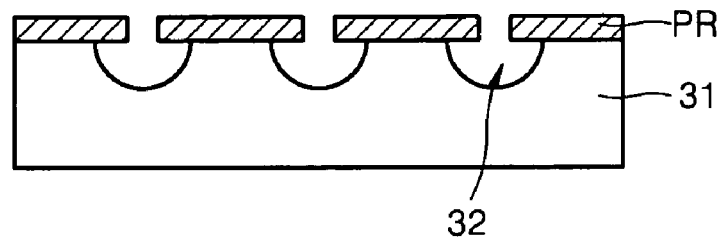
Figure 3E:
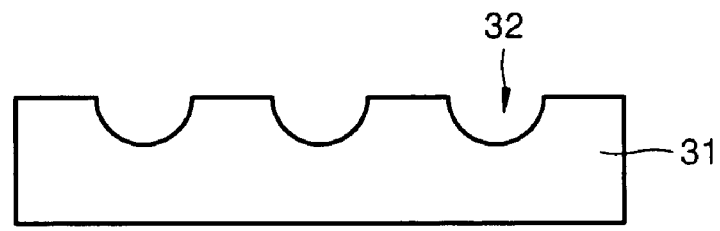
Figure 3F:
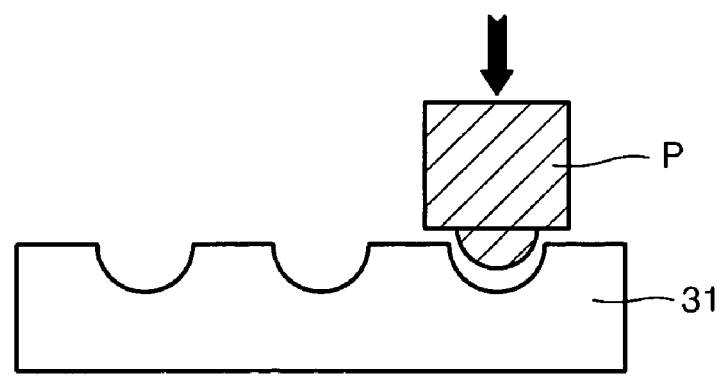

Referring to FIG. 3D, cavity 32 is formed by a wet or dry etching of exposed portions of the substrate 31 from which the photoresist PR has been removed. Referring to FIG. 3E, the remaining photoresist PR is removed to form a cavity array in the substrate 31. Referring to FIG. 3F, in order to form a uniform etching surface, pressure is applied to the cavity 32 using a punch P having an ultraprecise aspheric surface. The aspheric shape of the punch P is transferred on the substrate 31 in order to make a curved surface of the cavity 32 coincide with the aspheric shape of the punch P. For the purpose of effective molding, each cavity 32 may be heated locally or the whole substrate 31 may be heated. The aspheric die is processed precisely in a shape of a single lens. At this time, if the above-described method is used, a die for the lens array can be simply manufactured, thus reducing die cost.

A method of manufacturing a micro-lens array according to the present invention will now be described with reference to FIGS. 4A through 4E. FIGS. 4A through 4E are sectional views illustrating sequential procedures of manufacturing a micro-lens array according to an embodiment of the present invention. FIGS. 4F and 4G are sectional views illustrating sequential procedures of manufacturing a micro-lens array of a hybrid lens array type, in which a diffraction lens is attached to the micro-lens array that is manufactured by the method of FIGS. 4A through 4E.

Figure 4A:
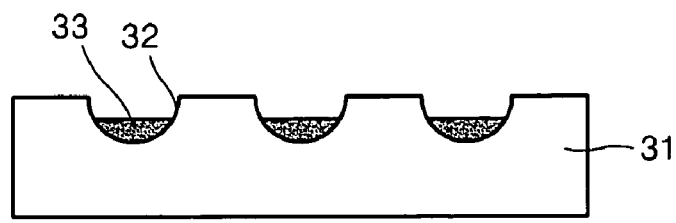
FIGS. 4A through 4E are sectional views illustrating sequential procedures of manufacturing a micro-lens array according to an embodiment of the present invention.

Referring to FIG. 4A, ultraviolet hardening material 33 is injected into the cavity array 32 of the substrate 31, which is manufactured using the method of FIGS. 3A through 3F. The ultraviolet hardening material 33 is a liquid polymer or sol-gel inorganic material and is hardened when irradiated with ultraviolet rays. Such an ultraviolet hardening material is also a high refractive index material. Preferably, the refractive index of the ultraviolet hardening material is not greatly different from that of the refractive lens 35. Also, the ultraviolet hardening material preferably has a low light absorptance and a high light transmittance at a wavelength of around 405 nm. Further, the ultraviolet hardening material preferably is in a liquid phase having a high fluidity in order to implement an ultraprecise aspheric lens. Such material is advantageous in that it can reduce coma aberration by decreasing a tilt of the lens and can compensate for thickness deviation of a ball lens. Commercial examples of the ultraviolet hardening material for use in the present invention include ZPU12 and ZPU13-RI, available from Zen Photonics Co., Ltd., and MINS 216E-02, available from Minuta Technology Co., Ltd.

Figure 4B:
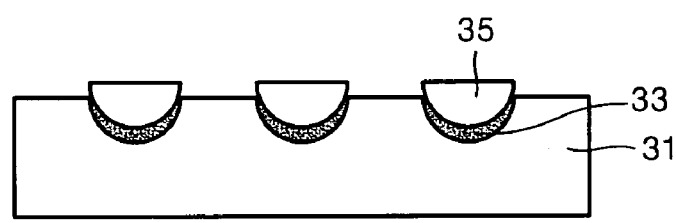
Figure 4C:
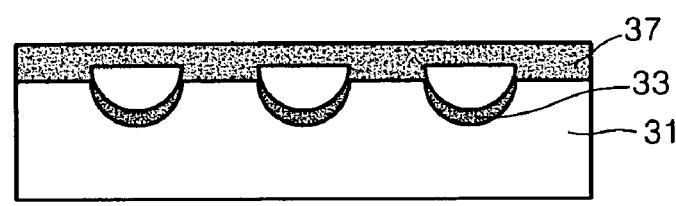

Referring to FIG. 4B, a refractive lens, for example a half ball lens 35, is inserted into the ultraviolet hardening material 33 of the cavity 32. Referring to FIG. 4C, ultraviolet hardening material 37 is again coated on a surface of the resulting structure. The ultraviolet hardening material 37 may be different from the material that is injected into the cavity 32. The half ball lens 35 preferably has a high refractive index ranging from 1.7 to 2.2. Accordingly, it is possible to form a thin micro-lens array having a high numerical aperture.

Figure 4D:
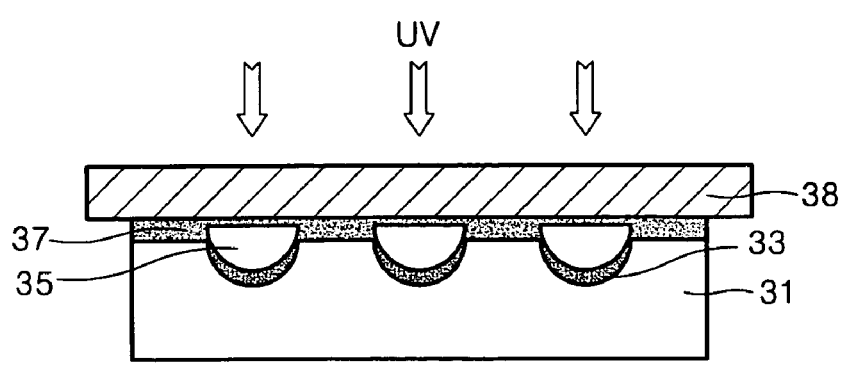

Referring to FIG. 4D, a transparent plate 38, such as glass, is pressed on the ultraviolet hardening material 37. At the same time, the ultraviolet hardening materials 33 and 37 are hardened by irradiating an ultraviolet ray from an upper portion of the substrate 31. While the ultraviolet hardening materials 33 and 37 are hardened, the first ultraviolet hardening material 33 is attached to the half ball lens 35 and corrects the aspheric surface. Also, the second ultraviolet hardening material attaches the half ball lens 35 to the transparent plate 38.

Figure 4E:
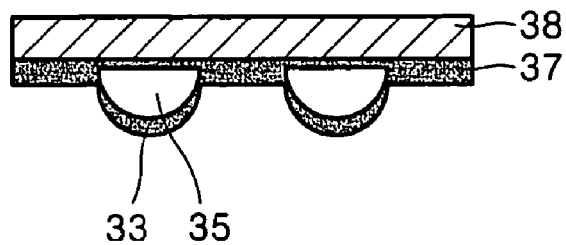
Figure 4F:
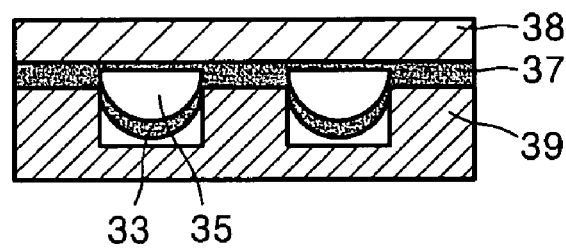
FIGS. 4F and 4G are sectional views illustrating sequential procedures of manufacturing a hybrid lens array, in which a diffraction lens is attached to a refractive lens array that is manufactured by the method of FIGS. 4A through 4E.
Figure 4G:
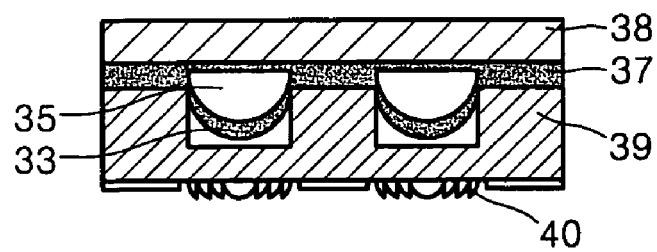

Referring to FIG. 4E, if the half ball lens 35 and the first ultraviolet hardening material 33 are demolded from the substrate 31, a refractive lens array is provided in which lenses 35 having an aspheric curved surface are formed on the transparent plate 38.

A method of manufacturing a micro-lens array having a hybrid lens structure, in which the refractive lens is combined with a diffraction lens or Fresnel lens, will now be described.

Referring to FIG. 4F, a support substrate 39 is aligned and assembled with the refractive lens array of FIG. 4E at a wafer level. The refractive lens array is inserted into concave portions of the support substrate 39. Referring to FIG. 4G, a diffraction lens 40 is aligned at a position corresponding to the refractive lens, which is formed on one side of the support substrate 39. In such manner, a micro-lens array having a hybrid lens structure, in which the refractive lens array and the diffraction lens array are assembled, is provided.

Figure 5A:
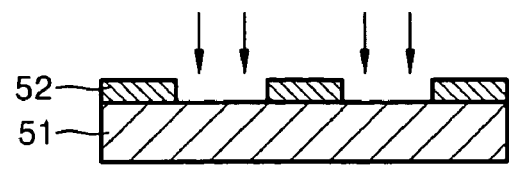
FIGS. 5A through 5C are sectional views illustrating an example of a support substrate that is used in the present invention.
Figure 5B:
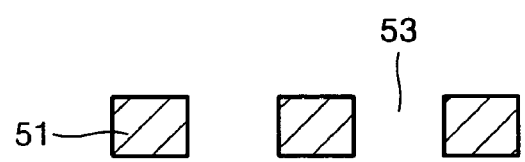
Figure 5C:
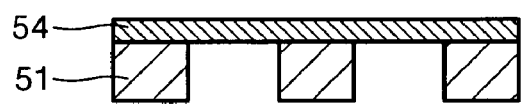

A method of forming the support substrate 39 will now be described in detail. FIGS. 5A through 5C are sectional views illustrating sequential procedures of forming the support substrate 39.

Referring to FIG. 5A, resist pattern 52 is formed on a silicon substrate 51 through a semiconductor photolithography process, etc.

Referring to FIG. 5B, cylindrical through-holes 53 are formed by anisotropic etching, such as reactive ion etching.

Referring to FIG. 5C, the resultant structure is anodic-bonded with a glass substrate 54.

Figure 5D:
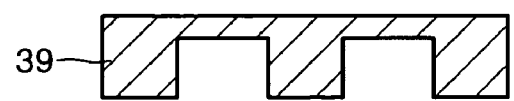
FIGS. 5D through 5E are sectional views illustrating another example of a support substrate that is used in the present invention.
Figure 5E:
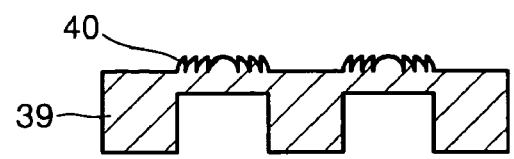

FIG. 5D is a view of a support substrate, which is formed using a method different from that of the method of FIGS. 5A through 5C. Referring to FIG. 5D, an upper die and a lower die are manufactured in a shape corresponding to the support substrate 39 by a machining process. The upper die and the lower die are assembled. Then, injection molding using plastic, such as PMMA, is performed, thereby completing the support substrate. FIG. 5E is a sectional view of another support substrate. When the die for plastic injection molding is manufactured, the die may be machined to have a curved shape corresponding to the diffraction lens 40. As such, the diffraction lens 40 is manufactured together with the injection molding of the support substrate 39 at the same time. In this case, a diffraction lens replication process, which will be described later in FIGS. 6A through 6E, is unnecessary.

A method of forming the diffraction lens, which is used in the hybrid lens array of the present invention, on the support substrate 39 will now be described in detail with reference to FIGS. 6A to 6E.

Figure 6A:
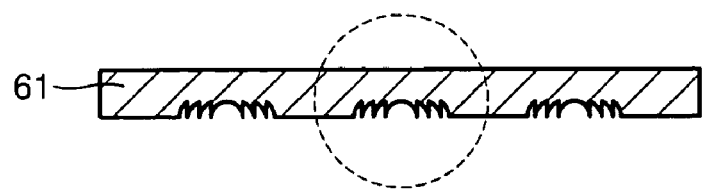
FIG. 6A through 6E are sectional views illustrating sequential procedures of forming a diffraction lens on a support substrate, in which the diffraction lens is used in the hybrid lens array according to the present invention.

Referring to FIG. 6A, a die 61 for a diffraction lens array having a shape corresponding to the curved surface of the diffraction lens is manufactured. Such a die may be manufactured by directly cutting and processing metal. For example, a single point diamond turning may be used. Also, it is possible to apply a method that manufactures a master by forming a three-dimensional pattern on the resist through exposure and development processes, such as an electron beam exposure, a laser exposure or gray scale photolithography, and performing a nickel electroforming on the three-dimensional resist pattern.

Figure 6B:
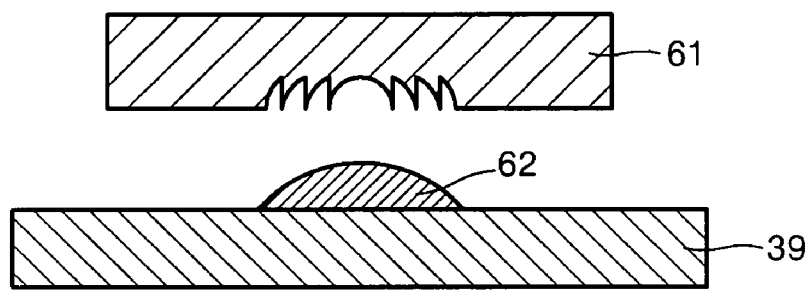

Referring to FIG. 6B, a proper amount of ultraviolet hardening material, for example, liquid polymer 62, is dispensed to the upper surface of the support substrate 39. Relative positions of the die 61 for the diffraction lens of FIG. 6A and the support substrate 39 are aligned.

Figure 6C:
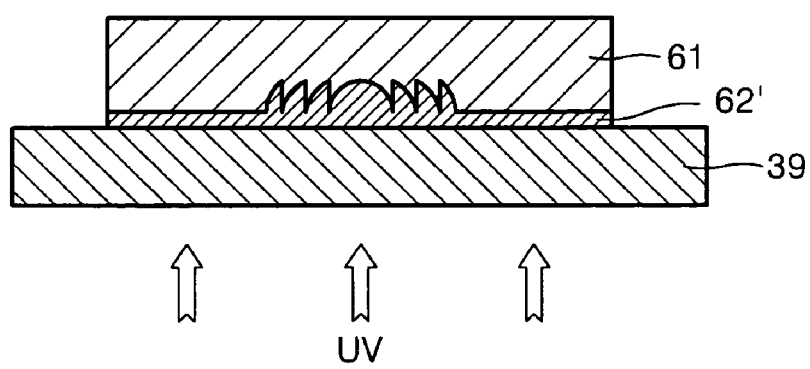

Referring to FIG. 6C, the die 61 for the diffraction lens is pressed on the liquid polymer 62 and an ultraviolet ray is irradiated to harden the liquid polymer 62.

Figure 6D:
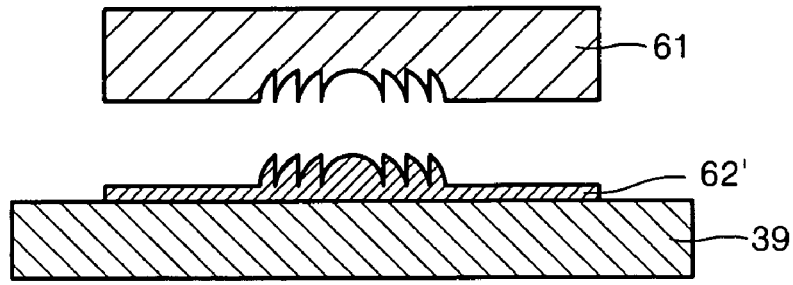

Referring to FIG. 6D, the die 61 for the diffraction lens is demolded from the hardened polymer 62', thereby forming the diffraction lens 40 on the support substrate 39.

Figure 6E:

In some cases, as shown in FIG. 6E, the shape of the diffraction lens may be transferred on the support substrate 39 by etching the hardened polymer 62' using an anisotropic etching technique, such as reactive ion etching. In the case where the support substrate 39 is formed of fused silica, glass, etc., such a transfer method can form a diffraction lens having more excellent thermal stability.

A micro-lens array and a manufacturing method thereof according to another embodiment of the present invention will now be described in detail with reference to FIGS. 7A through 7H. FIGS. 7A through 7F are sectional views illustrating sequential procedures of manufacturing a micro-lens array in which only a refractive lens is formed. FIGS. 7G and 7H are sectional views illustrating sequential procedures of manufacturing a hybrid micro-lens array, in which a diffraction lens as well as the refractive lens is formed.

Figure 7A:
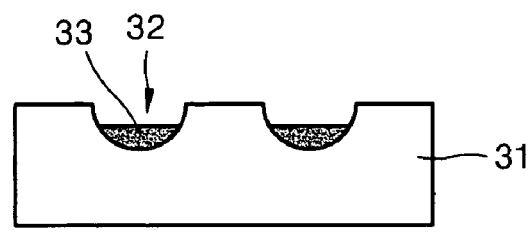
FIGS. 7A through 7F are sectional views illustrating sequential procedures of manufacturing a micro-lens array in which only a refractive lens is formed.

Referring to FIG. 7A, ultraviolet hardening material 33 is injected into the cavity array 32 of the substrate 31, which is manufactured using the method of FIGS. 3A through 3F. The ultraviolet hardening material 33 is a liquid polymer or sol-gel inorganic material and is hardened when irradiated with ultraviolet rays.

Figure 7B:
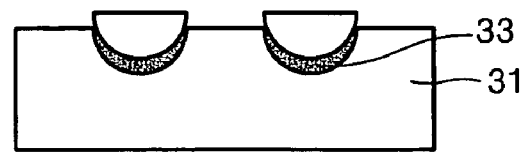
Figure 7C:
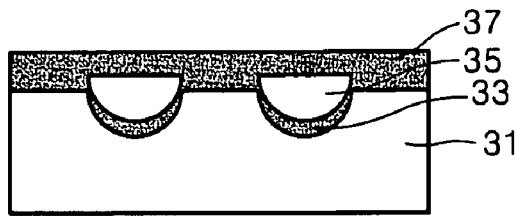

Referring to FIG. 7B, a half ball lens 35 is inserted into the ultraviolet hardening material 33 of the cavity 32. Referring to FIG. 7C, an ultraviolet hardening material 37 is again coated on a surface of the resulting structure. The ultraviolet hardening material 37 may be different from the material that is injected into the cavity 32. The half ball lens 35 preferably has a high refractive index ranging from 1.7 to 2.2. Accordingly, it is possible to form a thin micro-lens array having a high numerical aperture.

Figure 7D:
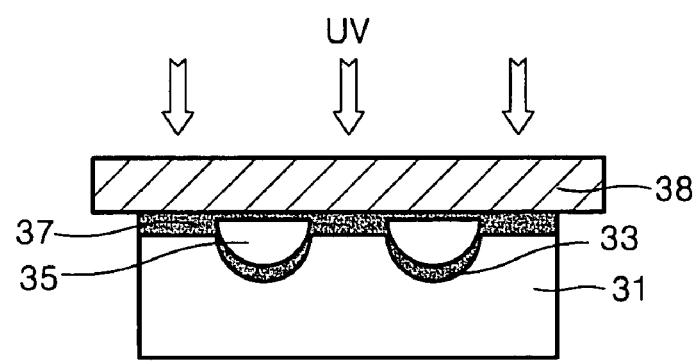
Figure 7E:
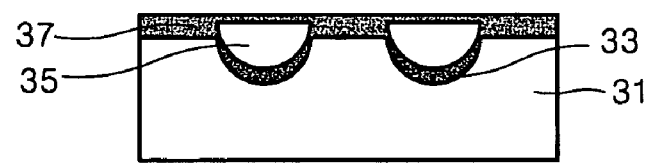

Referring to FIG. 7D, a transparent plate 38, such as glass, is pressed on the ultraviolet hardening material 37. At the same time, the ultraviolet hardening materials 33 and 37 are hardened by irradiating an ultraviolet ray from an upper portion of the substrate 31. While the ultraviolet hardening materials 33 and 37 are hardened, the first ultraviolet hardening material 33 is attached to the half ball lens 35 and corrects the aspheric surface. Referring to FIG. 7E, the transparent plate 38 is removed.

Figure 7F:
Figure 7G:
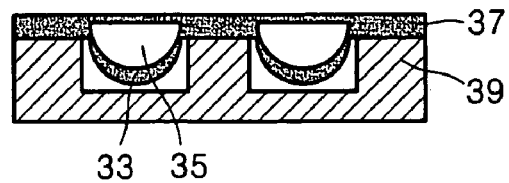
FIGS. 7G and 7H are sectional views illustrating sequential procedures of manufacturing a hybrid micro-lens array, in which a diffraction lens as well as a refractive lens is formed.
Figure 7H:
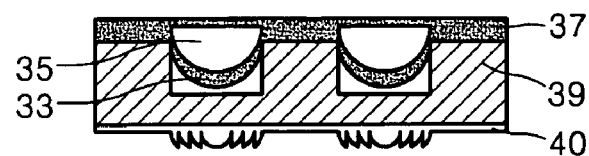

Referring to FIG. 7F, if the half ball lens 35 and the first ultraviolet hardening material 33 are demolded from the substrate 31, a refractive lens array is provided in which the lenses 35 having the aspheric curved surface are attached to the polymer substrate.

A method of manufacturing a micro-lens array having a hybrid lens structure, in which the refractive lens is assembled with a diffraction lens or Fresnel lens, will now be described.

Referring to FIG. 7G, a support substrate 39 is aligned and assembled with the refractive lens array of FIG. 7F at a wafer level. Referring to FIG. 7H, a diffraction lens 40 is aligned and formed at a position corresponding to the refractive lens, which is formed on one side of the support substrate 39. In such manner, a micro-lens array having a hybrid lens structure, in which the refractive lens array and the diffraction lens array are assembled together, is provided.

A micro-lens array and a manufacturing method thereof according to yet another embodiment of the present invention will now be described in detail with reference to FIGS. 8A through 8H. FIGS. 8A through 8H are sectional views illustrating sequential procedures of manufacturing a micro-lens array, in which only a refractive lens is formed. FIG. 8H is a sectional view of a hybrid micro-lens array, in which a diffraction lens as well as the refractive lens is formed.

Figure 8A:
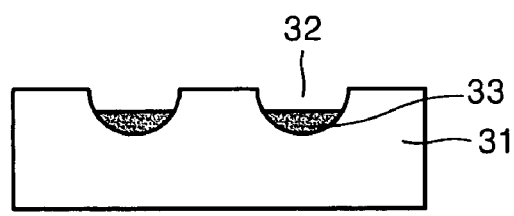
FIGS. 8A through 8G are sectional views illustrating sequential procedures of manufacturing a micro-lens array in which only a refractive lens is formed.

Referring to FIG. 8A, an ultraviolet hardening material 33 is injected into the cavity array 32 of the substrate 31, which is manufactured using the method of FIGS. 3A through 3F. The ultraviolet hardening material 33 is a liquid polymer or sol-gel inorganic material and is hardened when irradiated by ultraviolet rays.

Figure 8B:
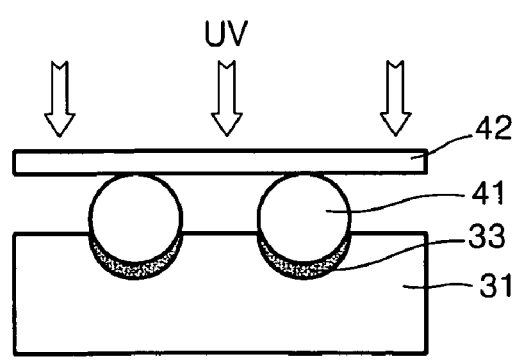

Referring to FIG. 8B, a ball lens 41 is inserted into the ultraviolet hardening material 33 of the cavity 32. A flat transparent plate 42 is horizontally positioned on the ball lens 41. At the same time, the ultraviolet hardening material 33 is hardened by irradiating an ultraviolet ray from an upper portion of the transparent plate 42, thereby fixing the ball lens 41 to an inside of the cavity 32.

Figure 8C:
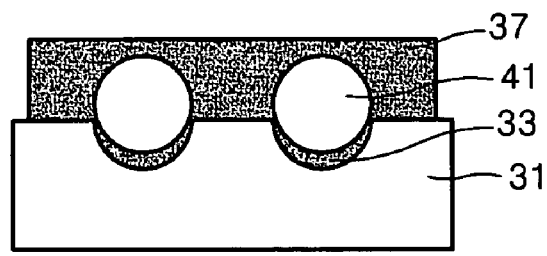

Referring to FIG. 8C, the flat transparent plate 42 is removed and an ultraviolet hardening material 37 is coated again. The ultraviolet hardening material 37 may be different from the material that is injected into the cavity 32. The half ball lens 35 preferably has a high refractive index ranging from 1.7 to 2.2. Accordingly, it is possible to form a thin micro-lens array having a high numerical aperture.

Figure 8D:
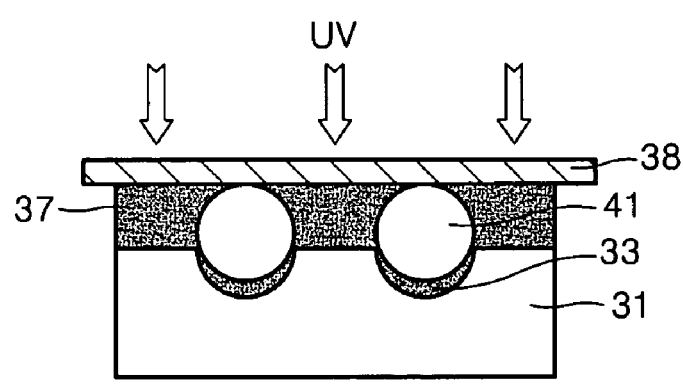

Referring to FIG. 8D, a transparent plate 38, such as glass, is pressed on the ultraviolet hardening material 37. At the same time, the ultraviolet hardening materials 33 and 37 are hardened by irradiating an ultraviolet ray from an upper portion of the substrate 31. While the ultraviolet hardening materials 33 and 37 are hardened, the first ultraviolet hardening material 33 is attached to the ball lens 41 and corrects the aspheric surface.

Figure 8E:
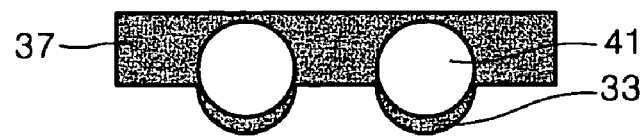

Referring to FIG. 8E, the transparent plate 38 is removed. The ball lens 41 and the first ultraviolet hardening material 33 are demolded from the substrate 31.

Figure 8F:
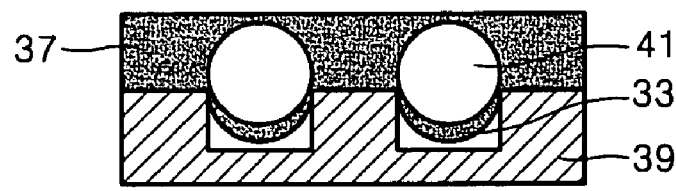
Figure 8G:
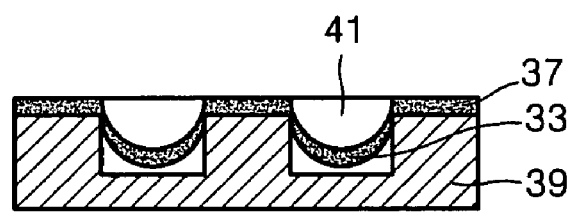
Figure 8H:
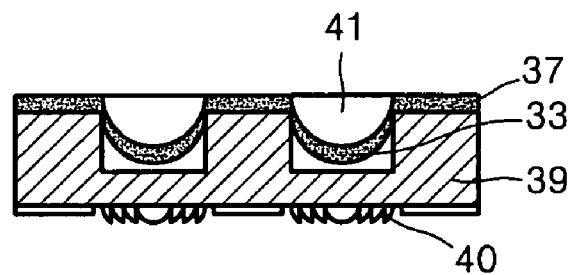
FIG. 8H is a sectional view illustrating a procedure of manufacturing a hybrid micro-lens array, in which a diffraction lens as well as a refractive lens is formed.

Referring to FIG. 8F, a support substrate 39 is aligned and assembled with the lens array of FIG. 8E at a wafer level. Referring to FIG. 8G, the hardening material 37 and the ball lens 37 are ground to a predetermined thickness, thereby providing a refractive lens array.

A method of manufacturing a micro-lens array having a hybrid lens structure, in which the refractive lens is assembled with a diffraction lens or Fresnel lens, will now be described.

Referring to FIG. 8H, a diffraction lens 40 is aligned and formed at a position corresponding to the refractive lens 41, which is formed on one side of the support substrate 39. In such manner, a micro-lens array having a hybrid lens structure, in which the aspheric refractive lens array 41 and the diffraction lens array are assembled together, is provided. The micro-lens array of the present invention is easily assembled with optical modules and can be separated into unit lenses according to the type of module.

In this embodiment, the ball lens is ground by a predetermined thickness over the entire area of the substrate, thereby minimizing the tilt of the lens surface.

A structure and operation principle of the micro-lens that is manufactured by the above methods will now be described in detail with reference to FIGS. 9A and 9B.

Figure 9A:
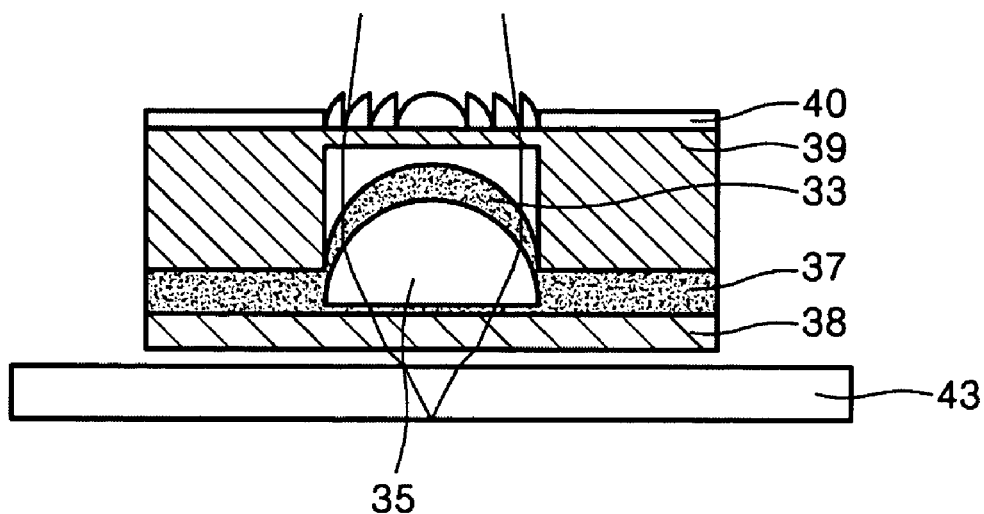
FIG. 9A is a sectional view illustrating an operation principle of the hybrid micro-lens that is manufactured by the method of FIGS. 4A through 4G.
Figure 9B:
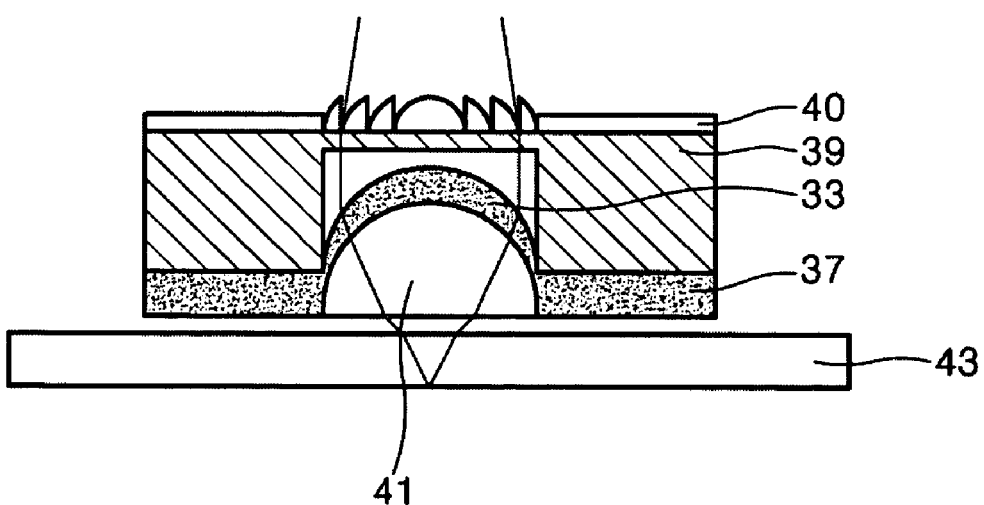
FIG. 9B is a sectional view illustrating a structure and operation principle of the hybrid micro-lens that is manufactured by the methods of FIGS. 7A through 7H and FIGS. 8A through 8H.

FIG. 9A is a sectional view illustrating an operation principle of the hybrid micro-lens manufactured by the method of FIGS. 4A through 4G, and FIG. 9B is a sectional view illustrating a structure and operation principle of the hybrid micro-lens that is manufactured by the methods of FIGS. 7A through 7H and FIGS. 8A through 8H.

A case in which a micro-lens is used in an optical pickup of an optical information storage device will now be described in detail with reference to FIGS. 9A and 9B. Light that is emitted from a LD (laser diode) is incident through optical elements (for example, a collimator lens, beam shaper, beam splitter, mirror, quarter waveplate, etc.) in a direction of the diffraction lens 40. Then, the light is diffracted and refracted somewhat and is incident on the aspheric surface of the refractive lens constituted by the polymer aspheric correcting surface 33. The light that is condensed by the refractive lens forms a minute optical spot, which is close to a diffraction limit, on a recording surface of an optical disk 43, such that the information is recorded or reproduced.

Such a refractive lens includes the ball or half ball lens having a spherical surface and the plastic lens having an aspheric surface. Therefore, in theory, precision that is equal to assembling a spherical lens and an aspheric lens is needed. Unlike the general process of assembling two lenses, the method of manufacturing the micro-lens array according to the present invention can minimize decentering of the optical axis between each lens surface and tilting of the surface. The reasons therefor will be described below.

Since liquid polymer material has a high fluidity, it is possible to precisely adjust a gap between the aspheric surface of the cavity and the spherical surface of the ball or half ball lens. Accordingly, an ultraprecise aspheric surface can be implemented. In manufacture of the die, if the lateral position of each cavity is formed precisely, the ball or half ball lens has only to be positioned inside each cavity as it is, such that a decentering error does not occur. In other words, the lateral position of the lens is restricted by a boundary of the cavity, and the ball or half ball lens is at minimum energy due to surface tension when positioned at the center of the cavity. Accordingly, automatic centering is possible.

Also, if the lateral position of the transparent plate is adjusted and pressed gradually in a state in which fluidity of the polymer is maintained, the ball or half ball lens is mounted at a lowest position of the cavity. Even if there is a diameter deviation of a ball or half ball lens, the liquid polymer acts as a buffer layer. Therefore, a vertical position of the lens is adjusted automatically, thereby compensating for the diameter deviation (height deviation).

According to the present invention, the manufacturing process is simplified using a single aspheric die, such that the manufacturing cost of the micro-lens array is reduced. Thus, the present invention is advantageous for mass production. Also, the present invention provides a lens having a corrected optical aberration and thus provides a thin optical module having excellent performance.

The present invention has following advantages.

First, a process of repeating a high-temperature heating/cooling or applying high pressure like a glass molding is unnecessary when manufacturing the refractive lens. Since the manufacturing process is performed at room temperature and at low pressure, the process cycle time is short and the process is simple, such that it is advantageous for mass production.

Second, the process of manufacturing the refractive lens is performed at room temperature and at low pressure, and there is almost no deformation caused by thermal expansion/contraction, no fatigue phenomenon and no abrasion caused by high pressure. Therefore, the lifetime of the die is considerably extended.

Third, the ball or half ball lens with a stable thermal characteristic occupies most of the lens volume, and the plastic material occupies a minimum volume and is used as a component that corrects the aspheric surface of the lens. Therefore, the lens of the present invention has enhanced excellent thermal stability and tolerance, especially for application of blue wavelengths, as opposed to a plastic lens.

Fourth, the ball or half ball lens can be formed of material having a high refractive index ranging from 1.7 to 2.2, so that a high numerical aperture of 0.85 is obtained without the need for aligning and assembling two lenses as in the case of plastic. Thus, a thin micro-lens can be provided.

Fifth, the ball or half ball lens is used in the manufacture of the refractive lens, so that decentering and tilting of the lens are small in characteristic of the spherical shape. Accordingly, it is possible to manufacture a lens that has minimized wave front aberration and high optical performance.

Sixth, the refraction lens array is supported by the support substrate and the diffraction lens array is formed on the support substrate. The lateral positions of lens arrays are easily aligned at a wafer level through a previously formed aligning mark. Accordingly, difficulty in assembly can be reduced greatly compared with the case where the two lenses are assembled.

Seventh, the micro-lens array of the present invention has a flat structure, making it easy to align and assemble with optical modules.

Eighth, according to the method of manufacturing the die for the cavity array of present invention, the die for the micro-lens array can be manufactured at minimum temperature and pressure and at a shorter time compared with the conventional mechanical method of manufacturing the die.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of manufacturing a micro-lens array, comprising:
    (a) forming at least one cavity on a substrate;
    (b) injecting a first ultraviolet hardening material into the cavity and positioning a lens on the first ultraviolet hardening material; and
    (c) coating a second ultraviolet hardening material on the lens and a surface of the substrate, positioning a transparent plate on the second ultraviolet hardening material, and irradiating an ultraviolet ray while pressing the second ultraviolet hardening material, thereby hardening the first and second ultraviolet hardening materials.

2. The method of claim 1, further comprising:
    (d) demolding the substrate from the lens and the ultraviolet hardening material and aligning and assembling a support substrate with respect to the lens; and
    (e) forming a diffraction lens at a position corresponding to the lens that is formed on the support substrate.

3. The method of claim 1, wherein the forming of the at least one cavity comprises:
    coating a photoresist on the substrate, positioning a mask having a predetermined pattern, and performing exposure and development processes to pattern the photoresist;

etching the exposed portion of the substrate to form the at least one cavity; and removing the photoresist and applying pressure to a surface of the cavity using an ultraprecise aspheric punch, thereby molding the cavity.

4. The method of claim 1, wherein the ultraviolet hardening material is one of a liquid polymer and sol-gel inorganic material.

5. The method of claim 1, wherein the transparent plate is formed of glass.

6. The method of claim 1, wherein the lens is a half ball lens.

7. The method of claim 1, wherein the operation (c) comprises:

demolding the transparent plate from the lens and the second ultraviolet hardening material; and demolding the substrate from the lens and the first ultraviolet hardening material.

8. The method of claim 7, further comprising:

(d) demolding the substrate from the lens and the ultraviolet hardening material and aligning and assembling a support substrate with respect to the lens; and (e) forming a diffraction lens at a position corresponding to the lens that is formed oh the support substrate.

9. The method of claim 7, wherein the forming of the at least one cavity comprises:

coating photoresist on the substrate, positioning a mask having a predetermined pattern, and performing exposure and development processes to pattern the photoresist;

etching the exposed portion of the substrate to form the at least one cavity; and removing the photoresist and applying pressure to a surface of the cavity using an ultraprecise aspheric punch, thereby molding the cavity.

10. A method of manufacturing a micro-lens array, comprising:

(a) forming at least one cavity on a substrate;

(b) injecting a first ultraviolet hardening material into the cavity and positioning a lens on the first ultraviolet hardening material;

(c) positioning a first transparent plate on the lens, irradiating an ultraviolet ray while pressing the lens, thereby hardening the first ultraviolet hardening material, and removing the first transparent plate; and (d) coating a second ultraviolet hardening material on the lens and a surface of the substrate, positioning a second transparent plate on the second ultraviolet hardening material, and irradiating an ultraviolet ray while pressing the lens, thereby hardening the first and second ultraviolet hardening materials.

11. The method of claim 10, further comprising:

(e) demolding the substrate from the lens and the ultraviolet hardening material, and aligning and assembling a support substrate with respect to the lens; and (f) grinding the lens and the second ultraviolet hardening material to a predetermined thickness, and forming a diffraction lens at a position corresponding to a half ball lens that is formed on the support substrate.

12. The method of claim 10, wherein the forming of the at least one cavity comprises:

coating a photoresist on the substrate, positioning a mask having a predetermined pattern, and performing exposure and development processes to pattern the photoresist;

etching the exposed portion of the substrate to form the at least one cavity; and removing the photoresist and applying a pressure to a surface of the cavity using an ultraprecise aspheric punch, thereby molding the cavity.

13. The method of claim 10, wherein the operation (d) comprises:

coating a second ultraviolet hardening material on the lens and a surface of the substrate;

positioning a second transparent plate on the substrate and the second ultraviolet hardening material, irradiating a ultraviolet ray while pressing the lens, thereby hardening the first and second ultraviolet hardening materials; and grinding the lens and the second ultraviolet hardening material to a predetermined thickness.

14. The method of claim 10, wherein the lens is a ball lens.

* * * * *